US011927773B2

(12) United States Patent
McKay et al.

(10) Patent No.: US 11,927,773 B2
(45) Date of Patent: Mar. 12, 2024

(54) SELF-HEATING LIQUID LENS AND SELF-HEATING METHODS FOR THE SAME

(71) Applicant: CORNING INCORPORATED, Corning, NY (US)

(72) Inventors: Ian Armour McKay, Mountain View, CA (US); Dragan Pikula, Horseheads, NY (US); Dean Michael Thelen, Addison, NY (US)

(73) Assignee: CORNING INCORPORATED, Corning, NY (US)

( * ) Notice: Subject to any disclaimer, the term of this patent is extended or adjusted under 35 U.S.C. 154(b) by 820 days.

(21) Appl. No.: 16/981,856

(22) PCT Filed: Mar. 19, 2019

(86) PCT No.: PCT/US2019/023038
§ 371 (c)(1),
(2) Date: Sep. 17, 2020

(87) PCT Pub. No.: WO2019/183147
PCT Pub. Date: Sep. 26, 2019

(65) Prior Publication Data
US 2021/0124094 A1    Apr. 29, 2021

Related U.S. Application Data

(60) Provisional application No. 62/645,641, filed on Mar. 20, 2018.

(51) Int. Cl.
*G02B 3/14* (2006.01)
*G02B 26/00* (2006.01)
*H05B 3/00* (2006.01)

(52) U.S. Cl.
CPC ............. *G02B 3/14* (2013.01); *G02B 26/005* (2013.01); *H05B 3/0004* (2013.01)

(58) Field of Classification Search
CPC .......... G02B 3/14; G02B 3/12; G02B 26/005; G02B 7/028; H05B 3/0004
See application file for complete search history.

(56) References Cited

U.S. PATENT DOCUMENTS 6,565,727 B1 * 5/2003 Shenderov ........ B01L 3/502746
204/600
7,567,395 B2   7/2009 Yuan
(Continued)

FOREIGN PATENT DOCUMENTS

JP    2012230105 A * 11/2012    ........ B01L 3/502792
KR   10-2005-0058577 A    6/2005
(Continued)

OTHER PUBLICATIONS

International Search Report and Written Opinion of the International Searching Authority; PCT/US2019/023038; dated Jul. 1, 2019; 10 Pages; European Patent Office.

*Primary Examiner* — George G. King
*Assistant Examiner* — Anna Smith
(74) *Attorney, Agent, or Firm* — Tamika A. Crawl-Bey

(57) ABSTRACT

A liquid lens comprising: a lens body including a cavity, a control electrode, and a common electrode; a first liquid disposed within the cavity and in electrical communication with the common electrode; a second liquid disposed within the cavity; an insulating layer in contact with the first liquid and the second liquid and separating the first liquid and the second liquid from the control electrode; and a driver driving a voltage differential across the common electrode and the control electrode, with the first liquid resisting current flow between the common electrode and the control electrode and thereby raising a temperature of the first liquid from a current temperature to a predetermined temperature, which is higher than the current temperature. The driver raises the temperature of the first liquid from the current (Continued)

temperature to the predetermined temperature by increasing a frequency of a voltage waveform of the voltage differential.

20 Claims, 5 Drawing Sheets

(56) References Cited

U.S. PATENT DOCUMENTS

| | | | |
|---|---|---|---|
| 2002/0176148 A1 | 11/2002 | Onuki et al. | |
| 2005/0041301 A1 | 2/2005 | Kibayashi | |
| 2016/0187642 A1* | 6/2016 | Karam | G02B 26/005 210/708 |
| 2017/0357035 A1* | 12/2017 | Nunnink | G02B 7/028 |

FOREIGN PATENT DOCUMENTS

| | | |
|---|---|---|
| WO | 2005/010376 A1 | 2/2005 |
| WO | 2005/103768 A2 | 11/2005 |

* cited by examiner

SELF-HEATING LIQUID LENS AND SELF-HEATING METHODS FOR THE SAME

CROSS-REFERENCE TO RELATED APPLICATIONS

This application claims the benefit of priority under 35 U.S.C. § 371 of International Application No. PCT/US2019/023038, filed on Mar. 19, 2019, which claims the benefit of priority under 35 U.S.C. § 119 to U.S. Provisional Application No. 62/645,641, filed Mar. 20, 2018, the content of each of which is incorporated herein by reference in its entirety.

BACKGROUND

1. Field

The present disclosure generally relates to a liquid lens, and more specifically, a liquid lens that includes self-heating capability.

2. Technical Background

Liquid lenses generally include two immiscible liquids disposed within a chamber. Varying the electric field to which the liquids are subjected can vary the wettability of one of the liquids with respect to the chamber wall, thereby varying the shape of the meniscus formed between the two liquids.

SUMMARY

According to a first aspect, a method of heating a liquid lens comprises: passing an electric current through a first liquid disposed within a cavity of the liquid lens, whereby the first liquid resists the current, which generates heat, and a temperature of the first liquid increases from a current temperature to at least a predetermined temperature that is greater than the current temperature.

According to a second aspect, the method of the first aspect is provided, wherein the electric current is generated via capacitance charge and discharge.

According to a third aspect, the method of the second aspect is provided, wherein an electrode, an insulating layer, and the first liquid function as a capacitor from which the capacitance charge and discharge occurs.

According to a fourth aspect, the method of any one of the first through third aspects is provided, wherein the first liquid is polar.

According to a fifth aspect, the method of any one of the first through fourth aspects is provided, the liquid lens further including a second liquid disposed within the cavity, the second liquid having a temperature, wherein raising the temperature of the first liquid from the current temperature to the predetermined temperature also raises the temperature of the second liquid without the electric current passing through the second liquid.

According to a sixth aspect, the method of the fifth aspect is provided, wherein raising the temperature of the first liquid from the current temperature to the predetermined temperature also raises the temperature of the second liquid due to conduction of heat from the first liquid to the second liquid via the electrode.

According to a seventh aspect, the method of any one of the first through sixth aspects is provided, further comprising: manipulating the first liquid to alter light transmitted through the first liquid via a voltage waveform having a first frequency; and increasing the first frequency of the voltage waveform to a second frequency, which is greater than the first frequency, wherein increasing the frequency of the voltage waveform to the second frequency causes the temperature of the first liquid to rise from the current temperature to the predetermined temperature.

According to an eighth aspect, the method of the seventh aspect is provided, wherein the second frequency is at least five times the first frequency.

According to a ninth aspect, the method of the seventh aspect is provided, wherein the second frequency is at least ten times the first frequency.

According to a tenth aspect, the method of the seventh aspect is provided, wherein the second frequency is at least fifteen times the first frequency.

According to a eleventh aspect, the method of the seventh aspect is provided, wherein the second frequency is at least twenty times the first frequency.

According to a twelfth aspect, the method of the seventh aspect is provided, wherein the first frequency is less than 10 kHz and the second frequency is greater than 50 kHz.

According to a thirteenth aspect, the method of the seventh aspect is provided, wherein manipulating the first liquid to alter light transmitted through the first liquid via a voltage waveform having the first frequency results in an energy dissipation per unit of time in the first liquid of less than 5 mW, and wherein the second frequency results in an energy dissipation per unit of time in the first liquid of more than 50 mW.

According to a fourteenth aspect, the method of any one of the first through thirteenth aspects is provided, wherein raising the temperature of the first liquid from the current temperature to the predetermined temperature occurs at a rate of at least 5 degrees Celsius per second.

According to a fifteenth aspect, the method of any one of the first through thirteenth aspects is provided, wherein raising the temperature of the first liquid from the current temperature to the predetermined temperature occurs at a rate of at least 10 degrees Celsius per second.

According to a sixteenth aspect, the method of any one of the first through thirteenth aspects is provided, wherein the current temperature is 0 degrees Celsius or less, and the predetermined temperature is 20 degrees Celsius or greater.

According to a seventeenth aspect, the method of any one of the first through fifteenth aspects is provided, wherein the predetermined temperature is at least 10 degrees Celsius greater than the current temperature.

According to an eighteenth aspect, the method of any one of the first through seventeenth aspects is provided, the liquid lens further including an operational state, wherein the first liquid is manipulated to alter light transmitted through the liquid lens, and a heating state, wherein the first liquid is heated to the predetermined temperature; the method further comprising causing the liquid lens to be in the heating state when the current temperature of the first liquid is determined to be below the predetermined temperature; and causing the liquid lens to be in the operational state when the current temperature of the first liquid is determined to be above the predetermined temperature.

According to a nineteenth aspect, the method of the eighteenth aspect is provided, wherein determining the current temperature of the first liquid includes applying a voltage such that a current forms through the first liquid, the current having a peak current value, and determining from the peak current value that the current temperature is below the predetermined temperature such that the lower the peak current value, the lower the current temperature.

According to a twentieth aspect, the method of the eighteenth aspect is provided, wherein the electrode, the insulating layer, and the first liquid function as a capacitor from which the capacitance charge and discharge occurs, and wherein determining the current temperature of the first liquid includes applying a voltage and measuring a rate of change of capacitance of the electrode, the insulating layer, and the first liquid functioning as a capacitor, and determining from the rate of change of the capacitance that current temperature is below the predetermined temperature such that the lower the rate of change, the lower the current temperature.

According to a twenty-first aspect, a liquid lens comprises: a lens body including a cavity, a control electrode, and a common electrode; a first liquid disposed within the cavity and in electrical communication with the common electrode; a second liquid disposed within the cavity; an insulating layer in contact with the first liquid and the second liquid and separating the first liquid and the second liquid from the control electrode; a driver driving voltage across the common electrode and the control electrode, with the first liquid resisting current flow between the common electrode and the control electrode and thereby raising a temperature of the first liquid from a current temperature to a predetermined temperature, which is higher than the current temperature.

According to a twenty-second aspect, the liquid lens of the twenty-first aspect is provided, wherein the voltage includes a voltage waveform having a frequency, and the driver raises the temperature of the first liquid from the current temperature to the predetermined temperature by increasing the frequency of the voltage waveform from a first frequency to a second frequency, and wherein, after the first liquid is at the predetermined temperature or above, the driver decreases the frequency of the voltage waveform.

According to a twenty-third aspect, the liquid lens of the twenty-first aspect is provided, wherein the first frequency of the voltage waveform manipulates the first liquid to alter light transmitted through the liquid lens.

According to a twenty-fourth aspect, the liquid lens of the twenty-third aspect is provided, wherein the second frequency is at least five times the first frequency.

According to a twenty-fifth aspect, the liquid lens of the twenty-third aspect is provided, wherein the second frequency is at least ten times the first frequency.

According to a twenty-sixth aspect, the liquid lens of the twenty-third aspect is provided, wherein the second frequency is at least fifteen times the first frequency.

According to a twenty-seventh aspect, the liquid lens of the twenty-third aspect is provided, wherein the second frequency is at least twenty times the first frequency.

According to a twenty-eighth aspect, the liquid lens of the twenty-third aspect is provided, wherein the first frequency is less than 10 kHz and the second frequency is greater than 50 kHz.

According to a twenty-ninth aspect, the liquid lens of the twenty-third aspect is provided, wherein the first frequency results in an energy dissipation per unit of time in the first liquid of less than 5 mW, and wherein the second frequency results in an energy dissipation per unit of time in the first liquid of more than 50 mW.

According to a thirtieth aspect, the liquid lens of any one of the twenty-first through twenty-ninth aspects is provided, wherein the current flow that the first liquid resists is generated via capacitance charge and discharge generated from the control electrode, the insulating layer, and the first liquid functioning as a capacitor providing the capacitance charge and discharge.

According to a thirty-first aspect, the liquid lens of any one of the twenty-first through thirtieth aspects is provided, wherein the first liquid is polar.

According to a thirty-second aspect, the liquid lens of any one of the twenty-first through thirty-first aspects is provided, wherein the driver raising the temperature of the first liquid from the current temperature to the predetermined temperature results in a temperature of the second liquid rising to the predetermined temperature, without current passing through the second liquid.

According to a thirty-third aspect, the liquid lens of the thirty-second aspect is provided, wherein conduction of heat from the first liquid to the second liquid via the control electrode is at least partially responsible for the temperature of the second liquid rising to the predetermined temperature.

According to a thirty-fourth aspect, the liquid lens of any one of the twenty-first through thirty-third aspects is provided, wherein the temperature of the first liquid rises from the current temperature to the predetermined temperature at a rate of at least 5 degrees Celsius per second.

According to a thirty-fifth aspect, the liquid lens of any one of the twenty-first through thirty-third aspects is provided, wherein the temperature of the first liquid rises from the current temperature to the predetermined temperature at a rate of at least 10 degrees Celsius per second.

According to a thirty-sixth aspect, the liquid lens of any one of the twenty-first through thirty-fifth aspects is provided, wherein the current temperature is 0 degrees Celsius or less, and the predetermined temperature is 20 degrees Celsius or greater.

According to a thirty-seventh aspect, the liquid lens of any one of the twenty-first through thirty-fifth aspects is provided, wherein the predetermined temperature is at least 10 degrees Celsius greater than the current temperature.

According to a thirty-eighth aspect, the liquid lens of any one of the twenty-first through thirty-seventh aspects are provided, wherein the driver drives voltage across the common electrode and the control electrode raising the first liquid to the predetermined temperature only when a separate controller controlling the driver or the driver determines that the current temperature is below the predetermined temperature.

According to a thirty-ninth aspect, the liquid lens of the thirty-eighth aspects is provided, wherein the current has a peak current value, and the separate controller or the driver determines from the peak current value that the current temperature is below the predetermined value, such that the lower the peak current value, the lower the current temperature.

According to a fortieth aspect, a liquid lens comprises: a lens body including a cavity, a first control electrode segment, a second control electrode segment, and a common electrode; a first liquid disposed within the cavity and in electrical communication with the common electrode; a second liquid disposed within the cavity; an insulating layer in contact with the first liquid and the second liquid and separating the first liquid and the second liquid from the first control electrode segment and the second control electrode segment; and a driver having an operational state and a heating state, wherein in the operational state, the driver drives voltage across the first control electrode segment and the common electrode, and across the second control electrode segment and the common electrode, to manipulate the first liquid to alter light transmitted through the liquid lens, and wherein in the heating state, the driver drives voltage across the first control electrode segment and the second control electrode segment, with the first liquid resisting current flow between the first control electrode segment and the second control electrode segment and thereby raising a temperature of the first liquid from a current temperature to a predetermined temperature, which is higher than the current temperature.

According to a forty-first aspect, the liquid lens of the fortieth aspect is provided, wherein the first liquid is polar.

According to a forty-second aspect, the liquid lens of any one of the fortieth through forty-first aspects is provided, wherein the driver raising the temperature of the first liquid from the current temperature to the predetermined temperature results in a temperature of the second liquid rising to the predetermined temperature, without current passing through the second liquid.

According to a forty-third aspect, the liquid lens of the forty-second aspect is provided, wherein conduction of heat from the first liquid to the second liquid via the first control electrode segment and second control electrode segment is at least partially responsible for the temperature of the second liquid rising to the predetermined temperature.

According to a forty-fourth aspect, the liquid lens of any one of the forty-first through forty-third aspects is provided, wherein the temperature of the first liquid rises from the current temperature to the predetermined temperature at a rate of at least 5 degrees Celsius per second.

According to a forty-fifth aspect, the liquid lens of any one of the forty-first through forty-third aspects is provided, wherein the temperature of the first liquid rises from the current temperature to the predetermined temperature at a rate of at least 10 degrees Celsius per second.

According to a forty-sixth aspect, the liquid lens of any one of the forty-first through forty-fifth aspects is provided, wherein the current temperature is 0 degrees Celsius or less, and the predetermined temperature is 20 degrees Celsius or greater.

According to a forty-seventh aspect, the liquid lens of any one of the forty-first through forty-fifth aspects is provided, wherein the predetermined temperature is at least 10 degrees Celsius greater than the current temperature.

According to a forty-eighth aspect, the liquid lens of any one of the forty-first through forty-seventh aspects is provided, wherein the driver has the heating state only when a separate controller controlling the driver or the driver determines that the current temperature is below the predetermined temperature.

According to a forty-ninth aspect, the liquid lens of the forty-eighth aspect is provided, wherein the current has a peak current value, and the separate controller or the driver determines from the peak current value that the current temperature is below the predetermined temperature, such that the lower the peak current value, the lower the current temperature.

According to a fiftieth aspect, a liquid lens comprises: a lens body including a cavity, a control electrode, a common electrode, and a heating electrode; a first liquid disposed within the cavity and in electrical communication with the common electrode; a second liquid disposed within the cavity; an insulating layer in contact with the first liquid and the second liquid, and separating the first liquid and the second liquid from the control electrode; and a driver having an operational state and a heating state, wherein, in the operational state, the driver drives voltage across the common electrode and the control electrode, to manipulate the first liquid to alter light transmitted through the liquid lens, and wherein, in the heating state, the driver drives voltage across the heating electrode and the common electrode, with the first liquid resisting current flow between the heating electrode and the common electrode and thereby raising a temperature of the first liquid from a current temperature to a predetermined temperature, which is higher than the current temperature.

According to a fifty-first aspect, the liquid lens of the fiftieth aspect is provided, wherein the insulating layer separates the first liquid from the heating electrode.

According to a fifty-second aspect, the liquid lens of the fiftieth aspect is provided, wherein the first liquid is in direct contact with the heating electrode.

According to a fifty-third aspect, the liquid lens of any one of the fiftieth through fifty-second aspects is provided, wherein the first liquid is polar.

According to a fifty-fourth aspect, the liquid lens of any one of the fiftieth through fifty-third aspects is provided, wherein the driver raising the temperature of the first liquid from the current temperature to the predetermined temperature results in a temperature of the second liquid rising to the predetermined temperature, without current passing through the second liquid.

According to a fifty-fifth aspect, the liquid lens of the fifty-fourth aspect is provided, wherein conduction of heat from the first liquid to the second liquid via the control electrode is at least partially responsible for the temperature of the second liquid rising to the predetermined temperature.

According to a fifty-sixth aspect, the liquid lens of any one of the fifty-first through fifty-fifth aspects is provided, wherein the temperature of the first liquid rises from the current temperature to the predetermined temperature at a rate of at least 5 degrees Celsius per second.

According to a fifty-seventh aspect, the liquid lens of any one of the fifty-first through fifty-fifth aspects is provided, wherein the temperature of the first liquid rises from the current temperature to the predetermined temperature at a rate of at least 10 degrees Celsius per second.

According to a fifty-eighth aspect, the liquid lens of any one of the fifty-first through fifty-fifth aspects is provided, wherein the current temperature is 0 degrees Celsius or less, and the predetermined temperature is 20 degrees Celsius or greater.

According to a fifty-ninth aspect, the liquid lens of any one of the fifty-first through fifty-fifth aspects is provided, wherein the predetermined temperature is at least 10 degrees Celsius greater than the current temperature.

According to a sixtieth aspect, the liquid lens of any one of the fifty-first through fifty-ninth aspects is provided, wherein the driver has the heating state only when a separate controller controlling the driver or the driver determines that the current temperature is below the predetermined temperature.

According to a sixty-first aspect, the liquid lens of the sixtieth aspect is provided, wherein the current has a peak current value, and the separate controller or the driver determines from the peak current value that the current temperature is below the predetermined temperature, such that the lower the peak current value, the lower the current temperature.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments.

DETAILED DESCRIPTION

Figure 1:
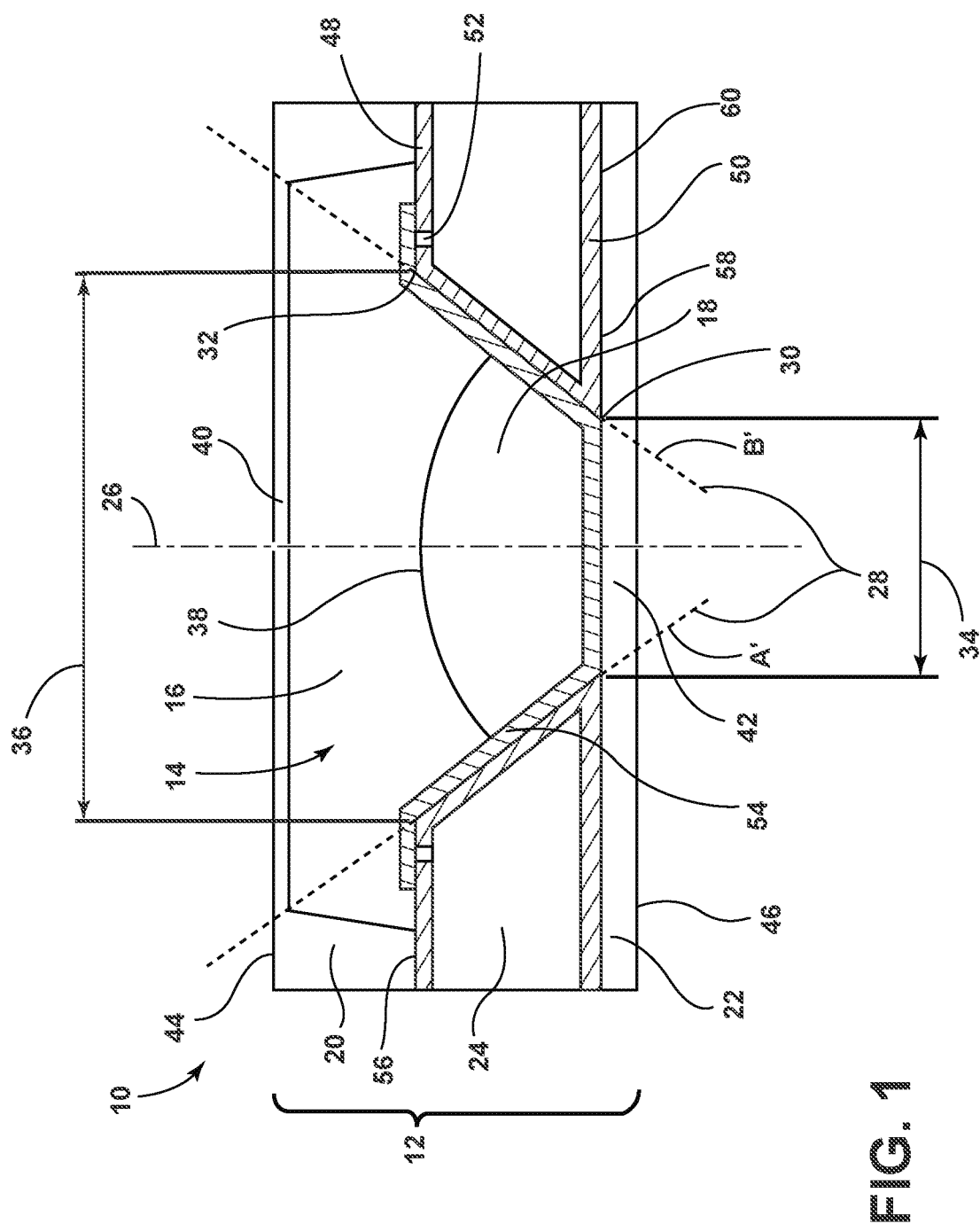
FIG. 1 is a cross-sectional view of an embodiment of a liquid lens of the present disclosure, illustrating a first liquid and a second liquid disposed in a cavity of a lens body of the liquid lens, the first liquid in electrical communication with a first conductive layer acting as a common electrode, and an insulating layer separating the first liquid and the second liquid from a second conductive layer acting as a control electrode.

Heating a liquid lens to an elevated temperature (e.g., room temperature or higher) can improve the performance of the liquid lens. For example, heating the liquid lens as described herein can enable improved speed and/or image quality of the liquid lens and/or a camera module comprising the liquid lens. Without wishing to be bound by any theory, it is believed that increasing the temperature of the liquids within the liquid lens reduces the viscosity of the liquids, thereby enabling the improved speed and/or image quality. Heating a liquid of the liquid lens directly can be advantageous compared to using a heat source external to the liquid lens. For example, an external heat source may require additional hardware, which adds cost and complexity and reduces available space. Heating the liquid of the liquid lens directly can be achieved, as described herein, without additional hardware and using existing components of the liquid lens. Heating the liquid of the liquid lens directly as described herein can be more energy efficient than heating the liquid indirectly through an externally placed heat source, because heat can be generated within the liquid itself (e.g., through resistance of electric current) and thus directed initially to liquid, whereas externally generated heat can be directed in directions and to components other than the liquid. Heating the liquid of the liquid lens directly as described herein can be quicker than heating the liquid via an externally placed heat source, for the same reason. Further, the components of the liquid lens, as described herein, can be used to monitor the temperature of the liquid of the liquid lens, rather than requiring a separate temperature sensor (e.g., an external temperature sensor).

Reference will now be made in detail to the present preferred embodiments, examples of which are illustrated in the accompanying drawings. Whenever possible, the same reference numerals will be used throughout the drawings to refer to the same or like parts.

Referring now to FIGS. 1-4, a liquid lens 10 is depicted in a form exemplary of the concepts and principles of the disclosure. As shown, the liquid lens 10 includes a lens body 12 having a cavity 14 retaining a first liquid 16 and a second liquid 18. In some embodiments, the lens body 12 includes a first outer layer 20, a second outer layer 22, and an intermediate layer 24 between the first outer layer 20 and the second outer layer 22. In some embodiments, the liquid lens 10 has an optical axis 26. The intermediate layer 24 has a through hole 28 (also referred to as a bore) denoted by dotted lines A' and B'. The optical axis 26 extends through the through hole 28. The through hole 28 is rotationally symmetric about the optical axis 26, and can take a variety of shapes, such as conical and cylindrical holes. Other possibilities are flared trumpet shapes, or concave bowl shapes, or combinations of any of these.

In some embodiments, the first outer layer 20, the second outer layer 22, and the through hole 28 of the intermediate layer 24 define the cavity 14. In other words, the cavity 14 is disposed between the first outer layer 20 and the second outer layer 22, and within the through hole 28 of the intermediate layer 24. A small gap (not illustrated) may separate each of the first outer layer 20, the second outer layer 22, and the intermediate layer 24 from their adjacent layer. In some embodiments, the through hole 28 has a narrow opening 30 and a wide opening 32. The narrow opening 30 has a diameter 34. The wide opening 32 has a diameter 36. In some embodiments, the diameter 36 of the wide opening 32 is greater than the diameter 34 of the narrow opening 30.

As mentioned above, the first liquid 16 and the second liquid 18 are disposed within the cavity 14. Because of the properties of the first liquid 16 and the second liquid 18, the first liquid 16 and the second liquid 18 may separate with an interface 38 between the first liquid 16 and the second liquid 18. For example, the first liquid 16 and the second liquid 18 can be substantially non-miscible or non-miscible such that the interface 38 is formed therebetween. The first liquid 16 can be a polar liquid or a conducting liquid. The second liquid 18 can be a non-polar liquid or an insulating liquid. The first liquid 16 can be substantially immiscible with, and have a different refractive index than, the second liquid 18, such that the interface 38 between the first liquid 16 and the second liquid 18 forms a lens. The first liquid 16 and the second liquid 18 can have substantially the same density, which can help to avoid changes in the shape of the interface 38 as a result of changing the physical orientation of the liquid lens 10 (e.g., as a result of gravitational forces).

In some embodiments, the liquid lens 10 further includes a first window 40 and a second window 42. The first window 40 can be part of the first outer layer 20. The second window 42 can be part of the second outer layer 22. For example, a portion of the first outer layer 20 covering or overlying the cavity 14 serves as the first window 40, and a portion of the second outer layer 22 covering or overlying the cavity 14 serves as the second window 42. In some embodiments, image light enters the liquid lens 10 through the first window 40, is refracted at the interface 38 between the first liquid 16 and the second liquid 18, and exits the liquid lens 10 through the second window 42.

The first outer layer 20 and/or the second outer layer 22 can comprise a sufficient transparency to enable passage of the image light. For example, the first outer layer 20 and/or the second outer layer 22 can comprise a polymeric, a glass, ceramic, or glass-ceramic material. Because image light can pass through the through hole 28 in the intermediate layer 24, the intermediate layer 24 need not be transparent to the image light. However, the intermediate layer 24 can be transparent to the image light. For example, the intermediate layer 24 can comprise a metallic, polymeric, a glass, ceramic, or glass-ceramic material. In the illustrated embodiment, each of the first outer layer 20, the second outer layer 22, and the intermediate layer 24 comprises a glass material. External surfaces 44, 46 of the first outer layer 20 and/or the second outer layer 22, respectively, can be, and in the illustrated embodiment, are substantially planar. Thus, although the liquid lens 10 can function as a lens (e.g., by refracting image light passing through the interface 38), the external surfaces 44, 46 of the liquid lens 10 can be flat as opposed to being curved like outer surfaces of a fixed lens. In other embodiments, the external surfaces 44, 46 of the first outer layer 20 and/or the second outer layer 22, respectively, can be curved (e.g., concave or convex). Thus, the liquid lens 10 comprises an integrated fixed lens.

In some embodiments, the liquid lens 10 further includes a first conductive layer 48 and a second conductive layer 50. For example, the first conductive layer 48 is disposed between the first outer layer 20 and the intermediate layer 24. Additionally, or alternatively, the second conductive layer 50 is disposed between the intermediate layer 24 and the second outer layer 22 and extends through the through hole 28 in the intermediate layer 24. The first conductive layer 48 and the second conductive layer 50 can be applied (such as by coating) to the intermediate layer 24 as one contiguous conductive layer before the first outer layer 20 and the second outer layer 22 are attached to the intermediate layer 24. In other words, substantially all of the intermediate layer 24 can be coated with a conductive layer. The conductive layer can then be segmented into the first conductive layer 48 and the second conductive layer 50. For example, the liquid lens 10 can include a scribe 52 in the conductive layer to form the first conductive layer 48 and the second conductive layer 50 and isolate (e.g., electrically isolate) the first conductive layer 48 and the second conductive layer 50 from each other.

Each of the first conductive layer 48 and the second conductive layer 50 can be metal or comprise metal. In the illustrated embodiment, the first conductive layer 48 and the second conductive layer 50 each comprise metal. The first conductive layer 48 and the second conductive layer 50 can include one or more of the metals, and/or oxides thereof, of Groups 4, 5, 6, 11, 13, and 14 of the Periodic Table, including mixed metal oxides. Example metals include gold, chromium, titanium, nickel, and/or copper including oxides thereof. Other materials for the first conductive layer 48 and the second conductive layer 50 can include a conductive polymer material, another suitable conductive material, or a combination thereof. Either of or both of the first conductive layer 48 and the second conductive layer 50 can comprise a single layer or a plurality of layers, some or all of which can be conductive. In some embodiments, the first conductive layer 48 functions as a common electrode in contact with the first liquid 16, and the terms "first conductive layer" and "common electrode" are used herein interchangeably. Additionally, or alternatively, the second conductive layer 50 functions as a control electrode, and is sometimes referred to as a driving electrode. The terms "second conducive layer," "driving electrode," and "control electrode" are used herein interchangeably. In some embodiments, the second conductive layer 50 is disposed on the through hole 28 (e.g., on sidewalls of the intermediate layer 24 facing the through hole) as well as between the intermediate layer 24 and the second outer layer 22.

In some embodiments, the second conductive layer 50 is insulated from the first liquid 16 and the second liquid 18, via an insulating layer 54. The insulating layer 54 is a dielectric and can comprise an insulating coating applied to the intermediate layer 24 before attaching the first outer layer 20 and/or the second outer layer 22 to the intermediate layer 24. The insulating layer 54 can comprise an insulating coating applied to the second conductive layer 50 and the second window 42 after attaching the second outer layer 22 to the intermediate layer 24 and before attaching the first outer layer 20 to the intermediate layer 24. Thus, the insulating layer 54 covers at least a portion of the second conductive layer 50 within the cavity 14 and optionally the second window 42. The insulating layer 54 can be sufficiently transparent to enable passage of image light through the second window 42 as described herein. The insulating layer 54 can cover at least a portion of the second conductive layer 50 (acting as the driving electrode) (e.g., the portion of the second conductive layer 50 disposed within the cavity 14) to insulate the first liquid 16 and the second liquid 18 from the second conductive layer 50. Additionally, or alternatively, at least a portion of the first conductive layer 48 (acting as the common electrode) disposed within the cavity 14 is uncovered by the insulating layer 54. In other words, the insulating layer 54 can be in contact with the first liquid 16 and second liquid 18, and can separate the first liquid 16 and the second liquid 18 from the second conductive layer 50 (the control electrode).

In some embodiments, the first outer layer 20 is bonded to the intermediate layer 24 at a bond 56. The bond 56 can be an adhesive bond, a laser bond (e.g., a laser weld), or another suitable bond capable of maintaining the first liquid 16 and the second liquid 18 within the cavity 14. Additionally, or alternatively, the second outer layer 22 can be bonded to the other side (e.g., the image side) of the intermediate layer 24. For example, the second outer layer 22 is bonded to the intermediate layer 24 at a bond 58 and/or a bond 60, each of which can be configured as described herein with respect to the bond 56.

Figure 2:
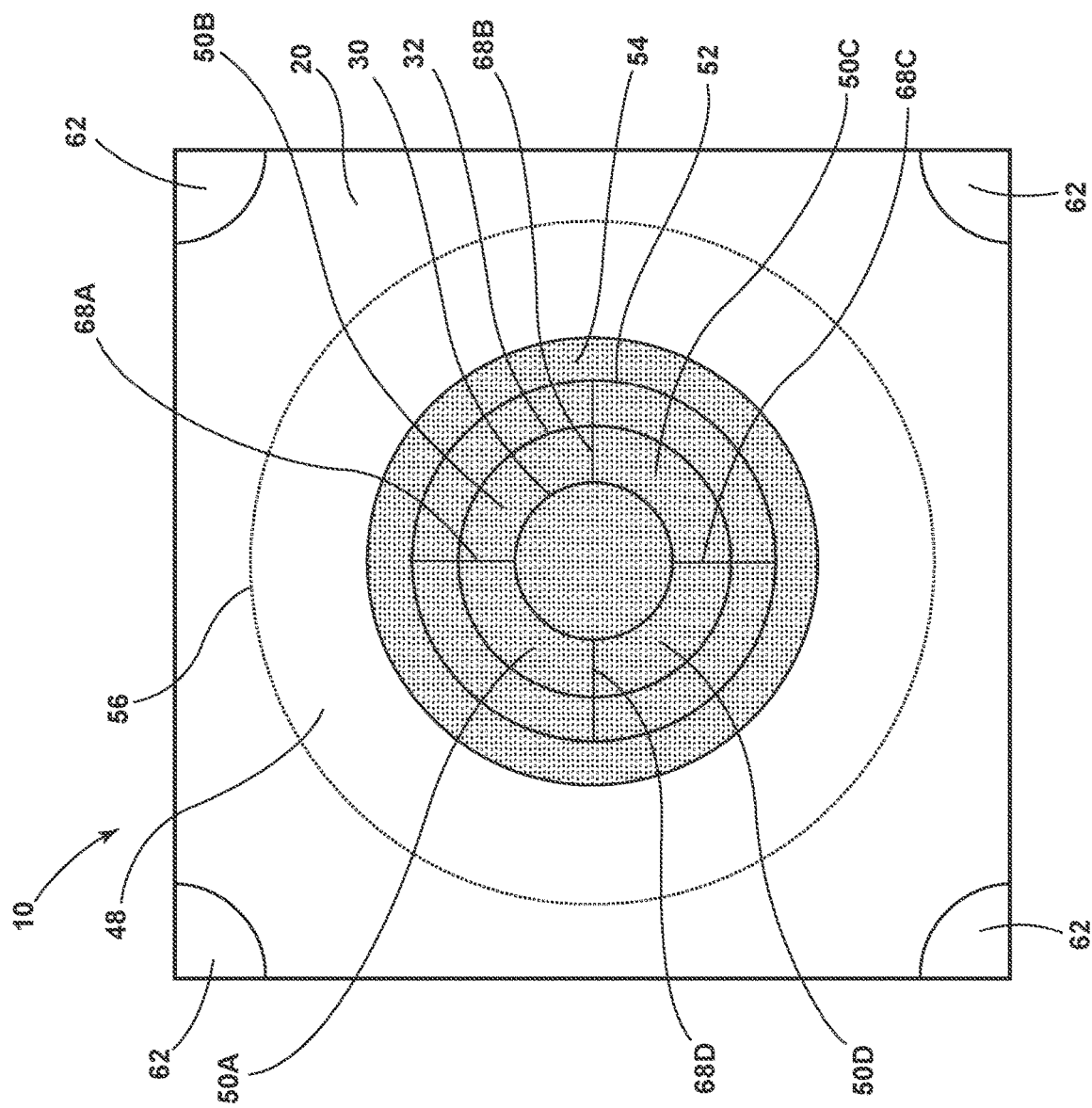
FIG. 2 is a top view of the liquid lens of FIG. 1, illustrating several scribes separating the second conductive layer (acting as the control electrode) into a first control electrode segment, a second control electrode segment, a third control electrode segment, and a fourth control electrode segment.

In some embodiments, the liquid lens 10 further includes one or more apertures 62 (or cutouts) through the first outer layer 20 (see FIG. 2). The apertures 62 can comprise portions of the liquid lens 10 at which the first conductive layer 48 (the common electrode) is exposed through the first outer layer 20, such as via removal of a portion of the first outer layer 20 or otherwise. Thus, the apertures 62 are configured to enable electrical connection to the first conductive layer 48 (the common electrode) and the regions of the first conductive layer 48 exposed at the apertures 62 can serve as contacts to enable electrical connection of the liquid lens 10 to a driver 64, a controller (not illustrated, including a controller controlling the driver 64), or another component of a lens or camera system. In other words, the apertures 62 can provide an electrical contact point between the liquid lens 10 and another electrical device.

Figure 3:
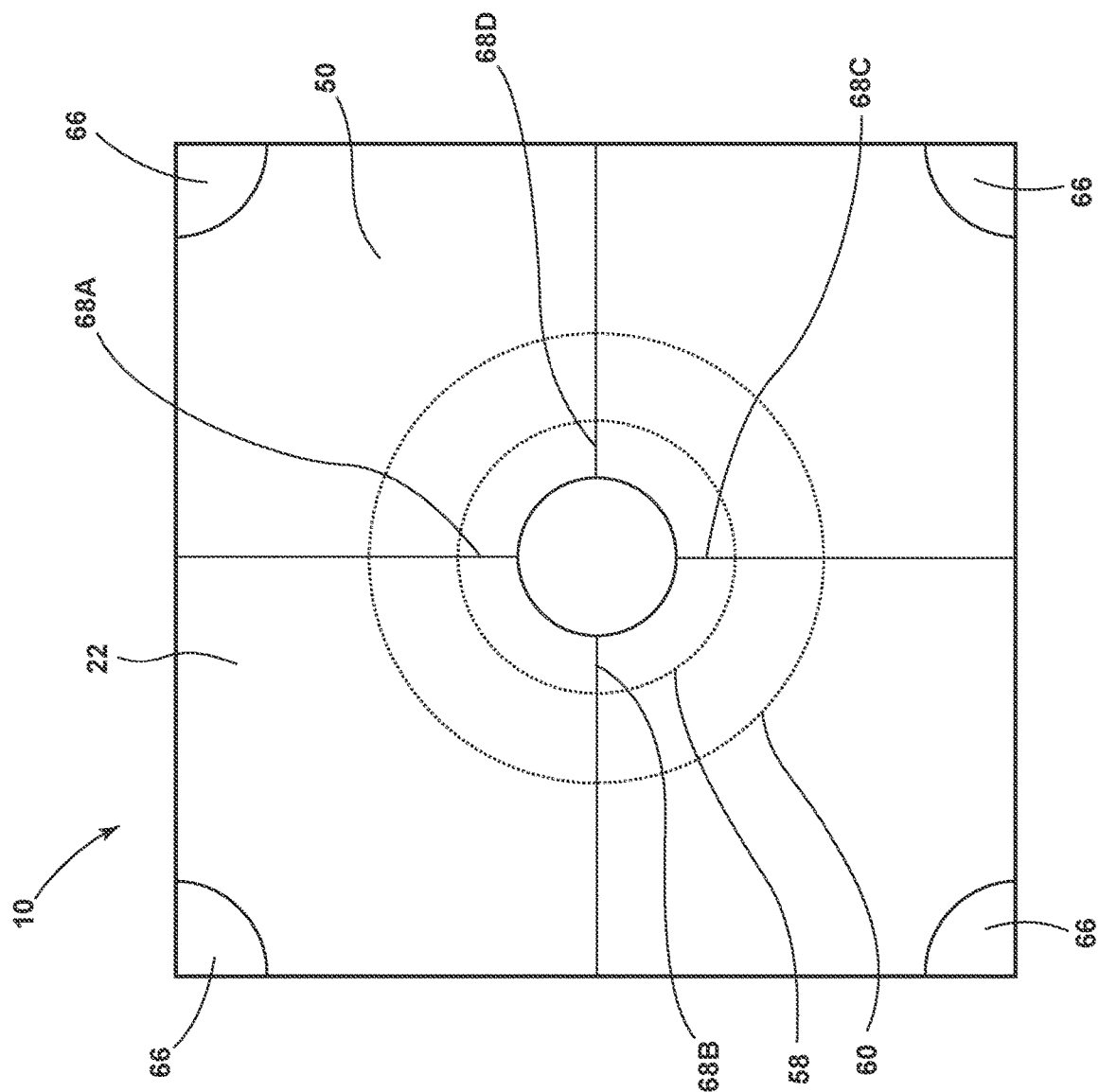
FIG. 3 is a bottom view of the liquid lens of FIG. 1, illustrating several apertures through a second outer layer of the lens body exposing the second conductive layer to allow for an electric connection of a driver or other device to the second conductive layer (acting as the control electrode) to manipulate the first liquid.

Likewise, the liquid lens 10 can comprise one or more apertures 66 (or cutouts) through the second outer layer 22 (see FIG. 3). The apertures 66 comprise portions of the liquid lens 10 at which the second conductive layer 50 (the control electrode) is exposed through the second outer layer 22, such as via removal of a portion of the second outer layer 22 or otherwise. Thus, the apertures 66 are configured to enable electrical connection to the second conductive layer 50 (the control electrode), and the regions of the second conductive layer 50 exposed at the apertures 66 can serve as contacts to enable electrical connection of the liquid lens 10 to the driver 64 and/or other previously mentioned devices.

In some embodiments, the second conductive layer 50 (the control electrode) comprises a plurality of control electrode segments 50A-50D. For example, in the embodiments shown in FIGS. 2 and 3, the second conductive layer 50 (the control electrode) comprises a first control electrode segment 50A, a second control electrode segment 50B, a third control electrode segment 50C, and a fourth control electrode segment 50D. In some embodiments, the control electrode segments 50A-50D are distributed substantially uniformly about a sidewall of the cavity 14. For example, each control electrode segment 50A-50D occupies about one quarter, or one quadrant, of the sidewall of the through hole 28 of the cavity 14. In some embodiments, adjacent control electrode segments are isolated from each other by a scribe. For example, first control electrode segment 50A and second control electrode segment 50B are isolated from each other by a scribe 68A. Additionally, or alternatively, second control electrode segment 50B and third control electrode segment 50C are isolated from each other by a scribe 68B. Additionally, or alternatively, third control electrode segment 50C and fourth control electrode segment 50D are isolated from each other by a scribe 68C. Additionally, or alternatively, fourth control electrode segment 50D and first control electrode segment 50A are isolated from each other by a scribe 68D. In some embodiments, the scribes 68A-68D between the various control electrode segments 50A-50D extend beyond the cavity 14 and onto the back side of the liquid lens 10 as shown in FIG. 3. Such a configuration can ensure electrical isolation of the adjacent control electrode segments 50A-50D from each other. Additionally, or alternatively, such a configuration can enable each control electrode segment 50A-50D to have a corresponding contact for electrical connection as described herein.

Although the second conductive layer 50 (the control electrode) is described herein as being divided into four control electrode segments 50A-50D, other embodiments are included in this disclosure. In some other embodiments, the second conductive layer 50 (the control electrode) is divided into two, three, five, six, seven, eight, or more control electrode segments.

The driver 64 can drive different voltage differentials to different control electrode segments 50A-50D to tilt the interface 38 of the liquid lens 10 (e.g., for OIS functionality). Additionally, or alternatively, the same voltage can be supplied to each control electrode segment 50A-50D to maintain the interface 38 of the liquid lens 10 in a substantially spherical orientation about the optical axis 26 (e.g., for autofocus functionality).

In some embodiments, the driver 64 has an operational state, where the driver 64 drives a voltage differential across the first conductive layer 48 (the common electrode) and the second conducive layer 50 (the control electrode) (e.g., via the apertures 62, 66) to manipulate the first liquid 16 (e.g., through a process referred to as electrowetting) and thus the interface 38 between the first liquid 16 and the second liquid 18 to alter light transmitted through the liquid lens 10. For example, applying a voltage differential to increase or decrease the wettability of the surface of the cavity 14 with respect to the first liquid 16 can change the shape of the interface 38. Changing the shape of the interface 38 can change the focal length or focus of the liquid lens 10. For example, such a change of focal length can enable the liquid lens 10 to perform an autofocus function. Additionally, or alternatively, adjusting the interface 38 can tilt the interface 38 relative to the optical axis 26 of the liquid lens 10. For example, such tilting can enable the liquid lens 10 to perform an optical image stabilization (OIS) function. Adjusting the interface 38 can be achieved without physical movement of the liquid lens 10 relative to an image sensor, a fixed lens or lens stack, a housing, or other components of a camera module in which the liquid lens 10 can be incorporated.

Figure 4:
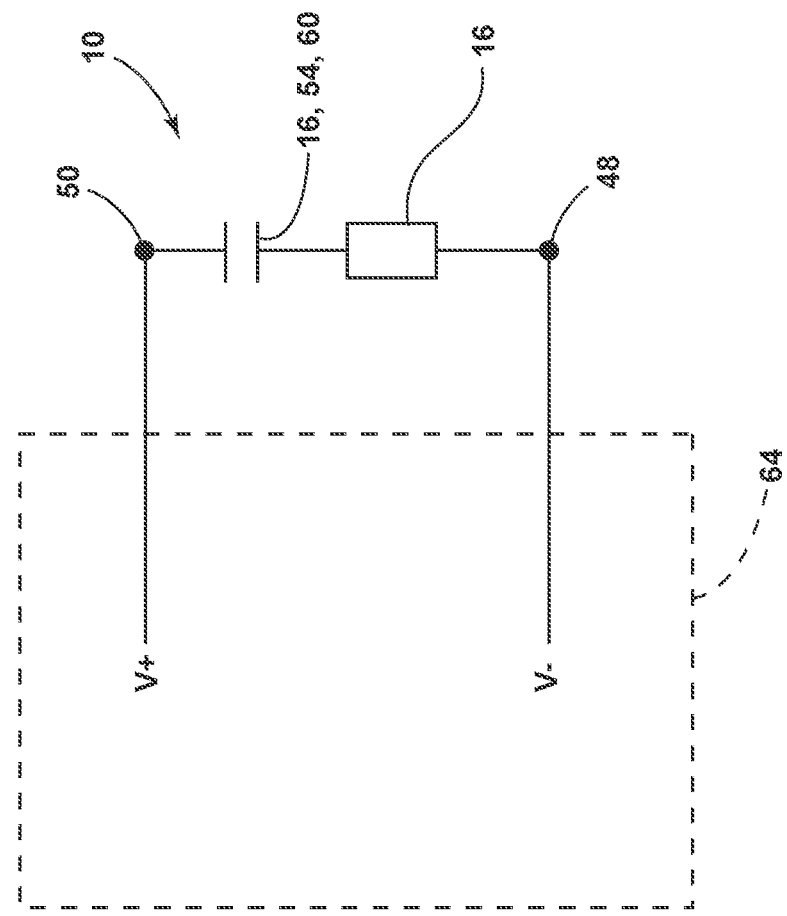
FIG. 4 is an equivalent circuit diagram for the liquid lens of FIG. 1, illustrating the driver driving a voltage across the first conductive layer (operating as the common electrode) and the second conductive layer (operating as the control electrode), with the first liquid resisting current flow between said layers and acting in series with the capacitance of the liquid lens, which is provided by the insulating layer separating the first liquid from the second conducive layer (acting as the control electrode)

When the driver 64 drives a voltage differential across the first conductive layer 48 (the common electrode) and the second conductive layer 50 (the control electrode), the first liquid 16 resists current flow between the first conductive layer 48 (the common electrode) and the second conductive layer 50 (the control electrode). In this embodiment of the liquid lens 10, the current flow that the first liquid 16 resists is generated via capacitance charge and discharge generated from the second conductive layer 50 (the control electrode), the insulating layer 54, and the first liquid 16 functioning as a capacitor providing the capacitance charge and discharge. This concept is illustrated in FIG. 4, which represents the liquid lens 10 as an equivalent circuit. The first liquid 16 resisting the current flow thereby results in an energy dissipation per unit of time (Power). The voltage differential driven across the first conductive layer 48 (the common electrode) and the second conductive layer 50 (the control electrode) can have a waveform, such as a periodic alternating current waveform. The capacitance charge and discharge generating the current flow that the first liquid 16 resists occurs at the pulse edges of the waveform. The voltage waveform has a frequency, that is, the waveform repeats at a frequency. In some embodiments, the frequency is less than 10 kHz. The resulting energy dissipation per unit of time (Power) can be insufficient to heat the first liquid 16 beyond a negligible amount. For example, the energy dissipation per unit of time in the first liquid 16 can be 5 mW or less.

In some embodiments, in addition to the operational state, the driver 64 has a heating state. In the heating state, the driver 64 leverages the first liquid 16 resisting the current flow resulting in an energy dissipation per unit of time (Power) to heat the first liquid 16, that is, to raise the temperature of the first liquid 16 from a current temperature (e.g., the temperature of the first liquid 16 at the present time) to a predetermined temperature, which is higher than the current temperature. The predetermined temperature can be a set number of degrees higher that the current temperature, or a specific temperature value. Because the voltage waveform has a frequency, and the current flow that the first liquid 16 resists occurs at the pulse edges of the waveform, increasing the frequency of the waveform increases the frequency of the pulse edges resulting in the current flow, and thus the frequency of the current flow. Accordingly, in the heating state, the driver 64 increases the frequency of the voltage waveform from the frequency utilized in the operational state (a first frequency) to a higher second frequency. Increasing the frequency of the voltage waveform to the second frequency results in raising the temperature of the first liquid 16 from the current temperature to the predetermined temperature. The second frequency can be at least five times the first frequency, at least ten times the first frequency, at least fifteen times the first frequency, at least twenty times the first frequency, among other times greater than the first frequency. For example, if the first frequency is less than 10 kHz, the second frequency can be 50 kHz or more. The increased frequency results in a greater energy dissipation per unit of time in the first liquid 16. For example, the second frequency can result in an energy dissipation per unit of time in the first liquid 16 of more than 50 mW. Because the volume of the first liquid 16 is in some embodiments small (e.g., ~2 mm³), such energy dissipation per unit of time can result in rapid heating of the first liquid 16. For example, the temperature of the first liquid 16 can rise from the current temperature to the predetermined temperature at a rate of at least 5 degrees Celsius per second, at a rate of at least 10 degrees Celsius per second, at a rate of at least 15 degrees Celsius per second, at a rate of at least 20 degrees Celsius per second, at a rate of at least 25 degrees Celsius per second, or at higher rates or any rates in between. In the heating state, the driver 64 raises the temperature of the first liquid 16 from the current temperature to the pre-established temperature in a matter of seconds or less, but without causing the first liquid 16 to boil at any particular spot within the cavity 14. For example, at a rate of temperature increase of 10 degrees Celsius per second, the temperature of the first liquid 16 rises from a current temperature of 0 degrees Celsius to a predetermined temperature of 20 degrees Celsius in two seconds. Additionally, or alternatively, at a rate of temperature increase of 10 degrees Celsius per second, the temperature of the first liquid 16 rises from a current temperature of 0 degrees Celsius to a predetermined temperature of 40 degrees Celsius in four seconds. Having a desired rate of temperature increase and a known volume of the first liquid 16, the desired energy dissipation per second can be determined, and from that, the desired second frequency to achieve the desired rate of temperature increase. In some instances, the second frequency can be any frequency between 100 kHz and 150 kHz.

To provide a more precise example, the energy dissipation per unit of time within the first liquid 16 can be determined from the equation $$P_{lens} = 2 f_{repetition} NCV_{max}^2 \frac{R}{R + R_d}$$

where $f_{repetition}$ is the frequency of waveform repetition, N is the number of control electrode segments 50A-50D, c is the capacitance of the combination of the first liquid 16, the insulating layer 54, and the second conductive layer 50 acting as a capacitor, $V_{max}$ is the applied voltage, R is the resistance of the first liquid, and $R_d$ is the resistance of the driver 64. This equation assumes that the capacitance of the combination of the first liquid 16, the insulating layer 54, and the second conductive layer 50 acting as a capacitor fully settles between each charge/discharge. The resistance of an example first liquid has been measured to be 20 kOhm. The capacitance of an example combination of the first liquid 16, the insulating layer 54, and the second conductive layer 50 has been measured to be 16 pF. An example driver 64 (LM5105M H-bridge drive with FDC3601N N-Channel MOSFETs as driver transistors) applies a $V_{max}$ of 70V and has a negligible resistance compared to the resistance of the first liquid 16. Assuming the first frequency is 5 kHz, such as when the driver 64 is in the operational state, and the number N of control electrode segments 50A-50D is 4, then the energy dissipation in the first liquid 16 is 3.1 mW. However, if the driver 64 enters the heating state and increases the frequency from the first frequency of 5 kHz to the second frequency of, for example, 100 kHz, the energy dissipation in the first liquid 16 is 62 mW. Such an energy dissipation, assuming for example that the first liquid 16 is water, would increase the temperature of the first liquid 16 at a rate of about 7.4 degrees Celsius per second. Stated another way, the second frequency of 100 kHz would raise the temperature of the first liquid 16 (assuming to be water) from a current temperature of 0 degrees Celsius to a predetermined temperature of 20 degrees Celsius in about 2.7 seconds. Such a period of time is an advantageous period of time to transform the liquid lens 10 from a potentially unsatisfactory operating condition to a more satisfactory operating condition.

The driver 64 can enter the heating state to raise the temperature of the first liquid 16 when the driver 64, or a separate controller (not illustrated) controlling the driver 64, determines that the current temperature is less than the predetermined temperature (or some other temperature between the current temperature and the predetermined temperature). For example, the driver 64 can enter the heating state when the current temperature is 5 degrees Celsius or less, or 0 degrees Celsius or less, among other temperatures, and the predetermined temperature of the first liquid 16 is 20 degrees Celsius or more (or some other temperature above the current temperature). Likewise, the driver 64 can exit the heating state and stop raising the temperature of the first liquid 16 when the driver 64, or the separate controller controlling the driver 64, determines that the current temperature of the first liquid 16 has met or exceeded the predetermined temperature. The predetermined temperature could be the desired operating temperature for the liquid lens 10. For example, the predetermined temperature could be 20 degrees Celsius or greater. The predetermined temperature could be a certain number of degrees greater than the current temperature. For example, the predetermined temperature could be at least 10 degrees Celsius greater than the current temperature, 15 degrees Celsius greater than the current temperature, or more or less.

After the driver 64 raises the temperature of the first liquid 16 to the predetermined temperature, the driver 64 can cease being in the heating state and return to, or begin operating in, the operational state. In some embodiments, another component of the device utilizing the liquid lens 10 (such as a camera or an image sensor) will emit sufficient heat to maintain the first liquid 16 at, near, or above the predetermined temperature where performance of the liquid lens 10 is improved. Thus, in some embodiments, the driver 64 can return from the heating state to the operational state while the first liquid 16 is maintained at or near the predetermined temperature. In some embodiments, the driver 64 (or the separate controller controlling the driver 64) causes the liquid lens 10 to be in the heating state when the temperature of the first liquid 16 is determined to be below the predetermined temperature, and/or causes the liquid lens 10 to be in the operational state when the temperature of the first liquid is determined to be above the predetermined temperature.

The driver 64, or the separate controller controlling the driver 64, can determine the current temperature of the first liquid 16, such as to determine whether the current temperature of the first liquid 16 is below the predetermined temperature. For example, the current temperature can be determined by analyzing the current that the first liquid 16 is resisting. The current has a peak current value. The lower the current temperature of the first liquid 16, the greater the resistance the first liquid 16 has to the current, and the lower the peak current value. Accordingly, the current temperature can be determined from measurement of the peak current value.

Alternatively, the driver 64, or the separate controller controlling the driver 64, can determine the current temperature of the first liquid 16 by applying a voltage and measuring the rate of change of capacitance of the second conductive layer 50 (control electrode), the insulating layer 54, and the first liquid 16 functioning as a capacitor. The lower the current temperature, the lower the rate of change of capacitance will be. Accordingly, the current temperature can be determined from the rate of change of capacitance. As yet another alternative, the driver 64, or the separate controller controlling the driver 64, can determine the current temperature via an adjacent dedicated temperature sensor.

The driver 64 raising the temperature of the first liquid 16 from the current temperature to the predetermined temperature in this manner additionally results in the second liquid 18 rising to the predetermined temperature as well, but without the current passing through the second liquid 18 (e.g., because the second liquid 18 may not be conductive). For example, the second conductive layer 50 (the control electrode) conducts heat from the first liquid 16 to the second liquid 18, and thus is at least partially responsible for the second liquid 18 rising to the second temperature. Additionally, or alternatively, heat is transferred (e.g., directly or indirectly) from the first liquid 16 to the second liquid 18, thereby increasing the temperature of the second liquid 18.

As detailed above, the second conductive layer 50 (the control electrode) can be subdivided into the first control electrode segment 50A, the second control electrode segment 50B, and so on. The insulating layer 54, which is in contact with the first liquid 16 and the second liquid 18, separates the first liquid 16 and the second liquid 18 from both the first control electrode segment 50A and the second control electrode segment 50B. In the operational state, the driver 64 drives a voltage differential across the first control electrode segment 50A and the first conductive layer 48 (the common electrode), and across the second control electrode segment 50B and the first conductive layer 48 (the common electrode), to manipulate the first liquid 16, and thus the interface 38 between the first liquid 16 and the second liquid 18 to alter light transmitted through the liquid lens 10.

In an alternative embodiment of the heating state, instead of driving voltage differential across the first conductive layer 48 (the common electrode) and the second conductive layer 50 (the control electrode), as in the embodiment above, the driver 64 drives voltage differential across the first control electrode segment 50A and the second control electrode segment 50B (or any two of the control electrode segments 50A-50D). This results in a current flow through the first liquid 16. The first liquid 16 resists the current flow and this resistance can be utilized to raise the temperature of the first liquid 16 from the current temperature of the first liquid 16 to the desired predetermined temperature of the first liquid 16, which is higher than the current temperature. In all other respects, the liquid lens 10 is the same as described above. For example, the current flowing through the first liquid 16 can have a peak current value and the current temperature can be determined to be below the preset value by measuring the peak current value.

Figure 5:
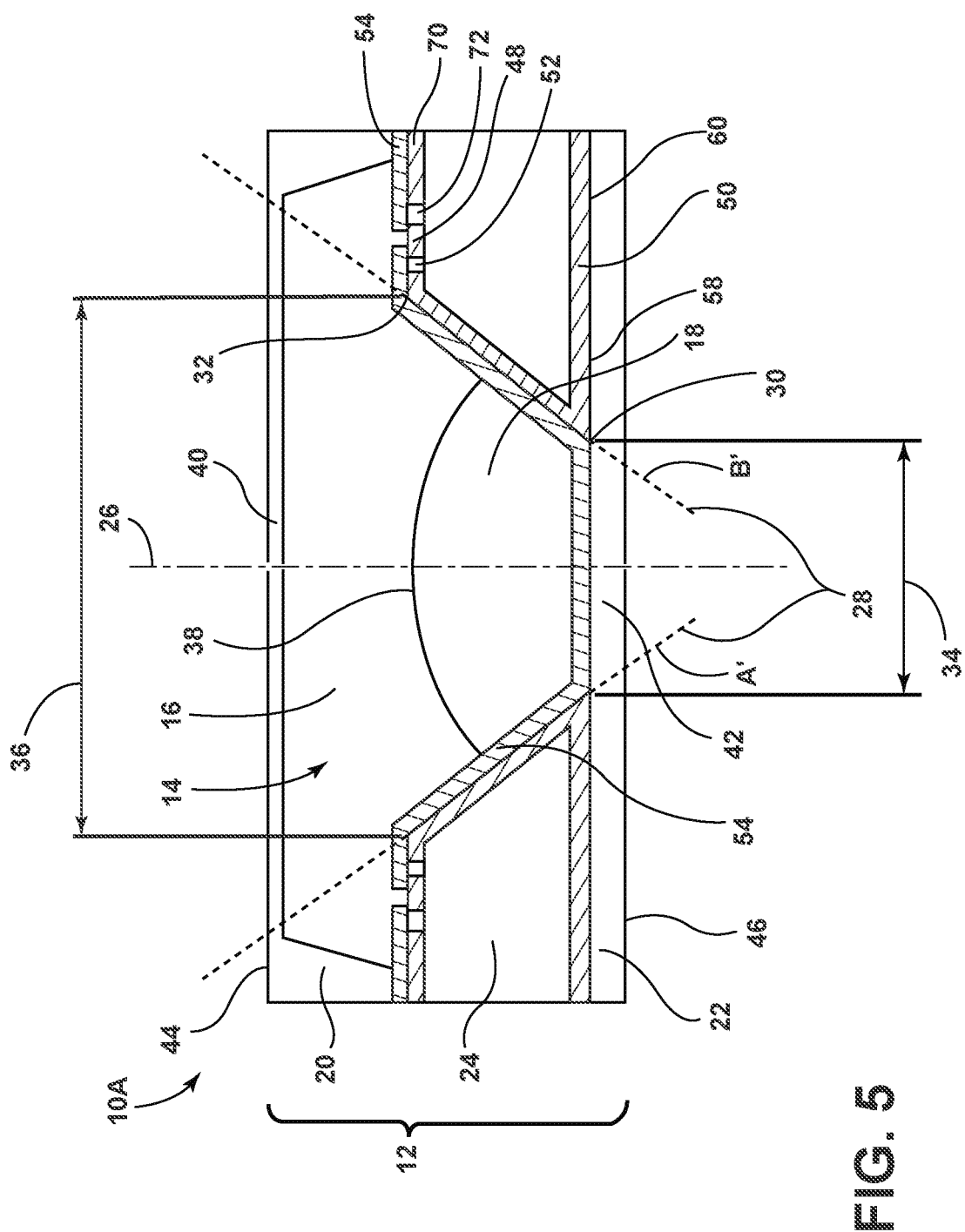
FIG. 5 is a cross-sectional view of another embodiment of a liquid lens of the present disclosure, illustrating a heating electrode separated from the first liquid by the insulating layer but otherwise the same as the liquid lens of FIG. 1.

Referring now to FIG. 5, another embodiment of the liquid lens 10, liquid lens 10A, is illustrated. Features with element numbers in common between the liquid lens 10A shown in FIG. 5 and the liquid lens 10 shown in FIGS. 1-4 have identical or substantially the same structure and/or function. More particularly, the liquid lens 10A is identical to the liquid lens 10 except that the liquid lens 10A further includes a dedicated heating electrode 70 in addition to the first conductive layer 48 (the common electrode) and the second conductive layer 50 (the control electrode). The heating electrode 70 can be separated from the first conductive layer 48 (the common electrode) by a scribe 72. In the operational state, the driver 64, as above, drives voltage across the first conductive layer 48 (the common electrode) and the second conductive layer 50 (the control electrode) to manipulate the first liquid 16, and thus the interface 38 between the first liquid 16 and the second liquid 18 to alter light transmitted through the liquid lens 10. However, in the heating state, the driver 64 drives voltage differential across the heating electrode 70 and the first conductive layer 48 (the common electrode), with the first liquid 16 resisting current flow between the heating electrode 70 and the first conductive layer 48 (the common electrode). This resistance heats the first liquid 16, thereby raising the temperature of the first liquid 16 from the current temperature to the predetermined temperature, which is higher than the current temperature, as before.

In the illustrated embodiment, the insulating layer 54 separates the first liquid 16 from the heating electrode 70. In such an embodiment, the heating electrode 70, insulating layer 54, and the first liquid 16 functions as a capacitor, with the capacitance charge and discharge causing current flow through the first liquid 16. However, the insulating layer 54 need not separate the first liquid 16 from the heating electrode 70 and the first liquid 16 can then be in direct contact with the heating electrode 70. Current, whether alternating current or direct current, then flows through the first liquid 16 directly between the heating electrode 70 and the first conductive layer 48 (the common electrode). In all other respects, the heating state of the driver 64 is as described above.

It will be apparent to those skilled in the art that various modifications and variations can be made without departing from the spirit or scope of the claims.

What is claimed is:

1. A method of heating a liquid lens, the method comprising:
   passing an electric current through a first liquid disposed within a cavity of the liquid lens, whereby the first liquid resists the current, which generates heat within the first liquid to thereby increase a temperature of the first liquid from a current temperature to at least a predetermined temperature that is greater than the current temperature.

2. The method of claim 1, wherein:
   the liquid lens comprises an electrode and an insulating layer disposed between the electrode and the first liquid; and
   the electric current is generated via capacitance charge and discharge, with the electrode, the insulating layer, and the first liquid functioning as a capacitor from which the capacitance charge and discharge occurs.

3. The liquid lens of claim 2, comprising:
increasing a frequency of a voltage waveform of a voltage differential across the capacitor, thereby raising the temperature of the first liquid from the current temperature to the predetermined temperature, and
after the first liquid is at the predetermined temperature or above, decreasing the frequency of the voltage waveform.

4. The liquid lens of claim 3, comprising manipulating the frequency of the voltage waveform to manipulate the first liquid to alter light transmitted through the liquid lens.

5. The method of claim 1, comprising:
manipulating the first liquid to alter light transmitted through the first liquid via a voltage waveform having a frequency; and
increasing the frequency of the voltage waveform from a first frequency to a second frequency that is greater than the first frequency;
wherein increasing the frequency of the voltage waveform from the first frequency to the second frequency causes the temperature of the first liquid to increase from the current temperature to the predetermined temperature.

6. The method of claim 1, wherein:
the liquid lens comprises an operational state in which the first liquid is manipulated to alter light transmitted through the liquid lens and a heating state in which the temperature of the first liquid is increased to the predetermined temperature; and
the method comprises:
    causing the liquid lens to be in the heating state when the current temperature of the first liquid is determined to be below the predetermined temperature; and
    causing the liquid lens to be in the operational state when the current temperature of the first liquid is determined to be at or above the predetermined temperature.

7. The method of claim 6, comprising:
determining a peak current value of current flowing through the first liquid;
determining the current temperature of the first liquid based on the peak current value; and
determining whether the current temperature is below the predetermined temperature.

8. The method of claim 6, comprising:
determining the current temperature of the first liquid by applying a voltage differential and measuring a rate of change of capacitance within the first liquid; and
determining whether the current temperature is below the predetermined temperature.

9. A liquid lens comprising:
a lens body including a cavity, a first control electrode segment, a second control electrode segment, and a common electrode;
a first liquid disposed within the cavity and in electrical communication with the common electrode;
a second liquid disposed within the cavity;
an insulating layer in contact with the first liquid and the second liquid and separating the first liquid and the second liquid from the first control electrode segment and the second control electrode segment; and
a driver having an operational state and a heating state;
wherein in the operational state, the driver drives a voltage differential across the first control electrode segment and the common electrode, and across the second control electrode segment and the common electrode, to manipulate the first liquid to alter light transmitted through the liquid lens; and
wherein in the heating state, the driver drives a voltage differential across the first control electrode segment and the second control electrode segment, with the first liquid receiving current therefrom and resisting the current flow between the first control electrode segment and the second control electrode segment, thereby raising a temperature of the first liquid from a current temperature to a predetermined temperature that is higher than the current temperature.

10. The liquid lens of claim 9, wherein the driver raising the temperature of the first liquid from the current temperature to the predetermined temperature results in raising a temperature of the second liquid, without current passing through the second liquid.

11. The liquid lens of claim 9, wherein the driver is in the heating state only when a separate controller controlling the driver or the driver determines that the current temperature is below the predetermined temperature.

12. The liquid lens of claim 11, wherein the separate controller or the driver determines the current temperature based on a peak current value of current flowing through the first liquid, and determines whether the current temperature is below the predetermined temperature.

13. The liquid lens of claim 9, wherein the temperature of the first liquid rises from the current temperature to the predetermined temperature at a rate of at least 5 degrees Celsius per second.

14. A liquid lens comprising:
a lens body comprising a cavity, a control electrode, a common electrode, and a heating electrode;
a first liquid disposed within the cavity and in electrical communication with the common electrode;
a second liquid disposed within the cavity;
an insulating layer in contact with the first liquid and the second liquid, and separating the first liquid and the second liquid from the control electrode; and
a driver having an operational state and a heating state,
wherein in the operational state, the driver drives a voltage differential across the common electrode and the control electrode to manipulate the first liquid to alter light transmitted through the liquid lens, and
wherein, in the heating state, the driver drives a voltage differential across the heating electrode and the common electrode, with the first liquid resisting current flow within the first liquid from between the heating electrode and the common electrode, thereby raising a temperature of the first liquid from a current temperature to a predetermined temperature.

15. The liquid lens of claim 14, wherein the insulating layer separates the first liquid from the heating electrode.

16. The liquid lens of claim 14, wherein the first liquid is in direct contact with the heating electrode.

17. The liquid lens of claim 14, wherein the driver raising the temperature of the first liquid from the current temperature to the predetermined temperature raises a temperature of the second liquid, without current passing through the second liquid.

18. The liquid lens of claim 14, wherein the temperature of the first liquid rises from the current temperature to the predetermined temperature at a rate of at least 5 degrees Celsius per second.

19. The liquid lens of claim 14, wherein the driver is in the heating state only when a separate controller controlling the driver or the driver determines that the current temperature is below the predetermined temperature.

20. The liquid lens of claim 19, wherein the separate controller or the driver determines the current temperature based on a peak current value of current flowing through the first liquid, and determines whether the current temperature is below the predetermined temperature.

\* \* \* \* \*